United States Patent
Boule et al.

(10) Patent No.: US 6,336,540 B1
(45) Date of Patent: Jan. 8, 2002

(54) DEVICE USING FRICTION IN A LIQUID MEDIUM AND HAVING A FRICTION LINING WITH CONTROLLED POROSITY

(75) Inventors: Philippe Boule, Rilhac-Rancon; Jean-Pierre Boutaud, Panazol; Erick Duno, Limoges; Philippe Pantier, Ambazac, all of (FR); George Skotnicki, Rochdale (GB)

(73) Assignee: Valeo, Paris (FR)

( * ) Notice: Subject to any disclaimer, the term of this patent is extended or adjusted under 35 U.S.C. 154(b) by 0 days.

(21) Appl. No.: 09/492,813

(22) Filed: Jan. 28, 2000

(30) Foreign Application Priority Data

Jan. 29, 1999 (FR) .............................. 99 01198

(51) Int. Cl.⁷ .............................................. F16D 69/00
(52) U.S. Cl. .............................. 192/107 M; 192/107 R; 192/113.3; 523/155
(58) Field of Search ........................ 192/107 R, 107 M, 192/70.12, 113.3; 188/71.6, 251 A; 523/153, 155, 156, 157, 158

(56) References Cited

U.S. PATENT DOCUMENTS

| | | | |
|---|---|---|---|
| 4,941,559 A | 7/1990 | Ishikawa et al. | |
| 5,456,343 A | * 10/1995 | Murata et al. | ...... 192/107 M X |
| 5,566,802 A | 10/1996 | Kirkwood | |
| 5,807,518 A | 9/1998 | Menard et al. | |
| 5,842,551 A | 12/1998 | Nels | |
| 5,890,572 A | * 4/1999 | Hirayanagi et al. | ... 192/113.3 X |
| 5,969,001 A | * 10/1999 | Kawai | .......................... 523/158 |
| 5,998,311 A | * 12/1999 | Nels | ................... 192/107 M X |
| 6,065,579 A | * 5/2000 | Nels | ....................... 192/107 M |

FOREIGN PATENT DOCUMENTS

| | | |
|---|---|---|
| DE | 3735978 A1 | 4/1988 |
| EP | 0681116 A2 | 11/1995 |
| EP | 0717212 A1 | 6/1996 |
| EP | 0867634 A2 | 9/1998 |
| FR | 2760504 A1 | 9/1998 |

OTHER PUBLICATIONS

PCT, WO95/26473, Published Oct. 5, 1995.

* cited by examiner

Primary Examiner—Rodney H. Bonck
(74) Attorney, Agent, or Firm—Liniak, Bernato, Longacre & White (57) ABSTRACT

The invention proposes a device using friction in a liquid medium having a support, notably metallic, on which an interface surface forms a support for a friction lining, with a flat annular shape overall, produced from a friction material which has a porous structure with communicating cells and which has areas (M1, M2, M3) with different controlled porosities. The method of manufacturing the friction lining including a step of moulding under pressure, whilst the interface surface of the support has at least one groove in which there extends the friction material moulded under pressure in order to constitute an area of controlled porosity (M1, M2) greater than the mean porosity (M2, M3) of the body made from friction material constituting the lining.

19 Claims, 5 Drawing Sheets

DEVICE USING FRICTION IN A LIQUID MEDIUM AND HAVING A FRICTION LINING WITH CONTROLLED POROSITY

BACKGROUND OF THE INVENTION

1. Field of the Invention

The present invention concerns a device using friction in a liquid medium such as, in particular, a clutch or brake disc, notably for an automatic gearbox or associated therewith, or such as a locking clutch, commonly referred to as a lock-up clutch, or such as a gearbox synchronisation ring or cone which carries a friction lining with a flat annular shape overall intended to equip a device using friction in a liquid medium.

2. Description of Related Art

The friction lining is in the form of a flat ring or a truncated cone and the device which is equipped therewith is a clutch or brake disc, notably for an automatic gearbox and associated therewith, functioning in oil, or a manually or robotically controlled gearbox synchronisation ring or cone also operating in oil, such a device being installed on board a motor vehicle.

Naturally the device can have several clutch or brake discs as described in the document U.S. Pat. No. 5,566,302.

The invention concerns for example a device equipped with a friction lining of the type produced from a friction material consisting of a mat of fibres impregnated with a thermosetting resin and whose manufacturing method includes a final curing step, associated with an operating of moulding or overmoulding, during which the annular blank of the lining, previously produced from the mat of impregnated fibres, is pressurised.

The composition and structure of a friction material consisting of a mat of fibres impregnated with a resin of the thermosetting type are described in detail in the document WO-A-95/26.473.

This document mentions notably the structural advantages and the advantages in use of such a type of material compared with the materials of the state of the art, and notably compared with the material of the "paper" type which consists essentially of cellulose fibres obtained by wet process in accordance with a normal paper manufacturing method, that is to say by dispersing cellulose fibres in an aqueous solution containing a resin, and then hydroextraction and drying.

Reference can also be made to the detailed content of this document in the context of the use of such a material for producing a friction lining on a device in accordance with the teachings of the invention.

This type of non-woven material, using a dry process, compared with the wet process used for obtaining a material of the paper type, has the structural advantage of being porous and including large porosities between 50 and 500 micrometers which communicate with each other, whilst the papers have small porosities of between 5 and 50 micrometers which do not communicate.

The concept of communicating porosity is a relative concept, that is to say it must be assessed with respect to the liquid in which the friction lining is immersed, that is to say in particular the oil of a transmission.

This is because oil does not pass through a material of the paper type whilst it does pass through the porous friction material produced in accordance with the teachings of the document WO-A-95/26.473.

The porosity of this type of material thus permits circulation of the oil actually inside the friction lining, notably from its inside diameter to its outside diameter and vice versa, which makes it possible to very effectively discharge the heat produced during the friction of the lining and thus to prevent temperature rises which might degrade the friction material, the oil or the system in general in which the clutch equipped with such a lining is incorporated.

Such an advantageous characteristic is of particular interest in controlled or continuous slip systems and in clutches.

On the other hand, this internal circulation of oil in the lining can be harmful in systems such as devices known as lock-up devices in which the friction lining must also fulfil a role of sealing joint in order to prevent the appearance of back pressures in the lock-up chamber resulting in a fall in the torque transmission capacity.

The document FR-A-2.760.504 has already proposed an improvement to a friction lining having recourse to a material of the type mentioned above in order to be able to use this type of material in different types of systems, perfectly controlling the flow of liquid.

This document proposes a friction lining of the type in which the method of manufacturing the friction lining includes a step of moulding, or overmoulding, and curing in a mould under pressure, and of the type which includes areas with different controlled porosities.

In accordance with the teachings of this document, being able to control the porosity of the friction material at all points on the lining, or in given areas of the latter, makes it possible to control the flow of oil inside the lining, or even to eliminate it, thus preserving the tribological properties of the friction lining.

According to other teachings of this document, the lining has at least one annular area with a lower controlled porosity, that is to say a density greater than the mean porosity of the body made of friction material constituting the lining, the annular area with controlled porosity consisting for example of a peripheral bevel arranged at one of the peripheral edges, internal or external, of the lining, or being obtained by virtue of a concentric annular insert, notably with an impermeable structure, whose thickness is less than the mean thickness of the flat annular lining, the annular portion opposite the material constituting the friction lining having a controlled porosity less than the mean porosity of the friction material.

This solution is notably satisfactory in the case of so-called lock-up devices in which the area of lower porosity makes it possible to "block" the circulation of oil inside the lining.

In the document EP-A-0867,634 the variation in porosity is obtained by means of a porous support. This solution is not economical because of the constitution of the carbon-based support.

SUMMARY OF THE INVENTION

The aim of the invention is to propose an economical solution for improving the circulation of oil in the friction lining and to improve the distribution of the stresses and deformations in the friction material.

To this end, the invention proposes a device of the type mentioned above, having a support impermeable to liquid, notably metallic, on which an interface surface forms a support for a friction lining, produced from a friction material which has a porous structure with communicating cells and which has areas with different controlled porosities, and of the type in which the method of manufacturing the friction lining includes a step of moulding under pressure, characterised in that the interface surface of the support has at least one groove in which there extends the friction material moulded under pressure in order to constitute an area of controlled porosity greater than the mean porosity of the body made from friction material constituting the lining, notably in order to form a channel for the oil to circulate inside the friction lining.

By virtue of the invention a better connection is obtained between the friction lining and its support. A better mechanical strength is thus obtained, notably against the effects of centrifugal force. Good draining of the oil is obtained.

According to other characteristics of the invention:
- the mean depth of the groove is between 10% and 50% of the mean thickness of the flat annular lining;
- the groove is such that it has a section, transverse to its general direction, which is perpendicular to the direction of shearing of the friction material during use of the device;
- at least part of the interface surface is not parallel to the active friction surface of the lining;
- the support is overall in the form of a flat ring and in that the interface surface has a frustoconical profile and in that the active friction surface is not parallel to the frustoconical interface surface so as to constitute an annular area with a controlled porosity less than the mean porosity of the body made of friction material constituting the lining;
- the interface surface is formed by the bottom of a wide annular groove formed in a lateral face of the flat annular support;
- the frustoconical interface surface has at least one narrow groove in which the friction material moulded under pressure extends;
- the friction material consists of a mat of fibres impregnated with a thermosetting resin;
- the size of the communicating cells is between 50 and 500 micrometers;
- the porosity of the friction material is less than 60%;
- the active friction surface of the lining has a network of grooves affording better circulation of oil between the friction lining and a reaction surface with which the device cooperates.

BRIEF DESCRIPTION OF THE DRAWINGS

Other characteristics and advantages of the invention will emerge from a reading of the following detailed description, for an understanding of which reference should be made to the accompanying drawings, in which.

DETAILED DESCRIPTION OF THE PREFERRED EMBODIMENTS

Figures 1, 2:
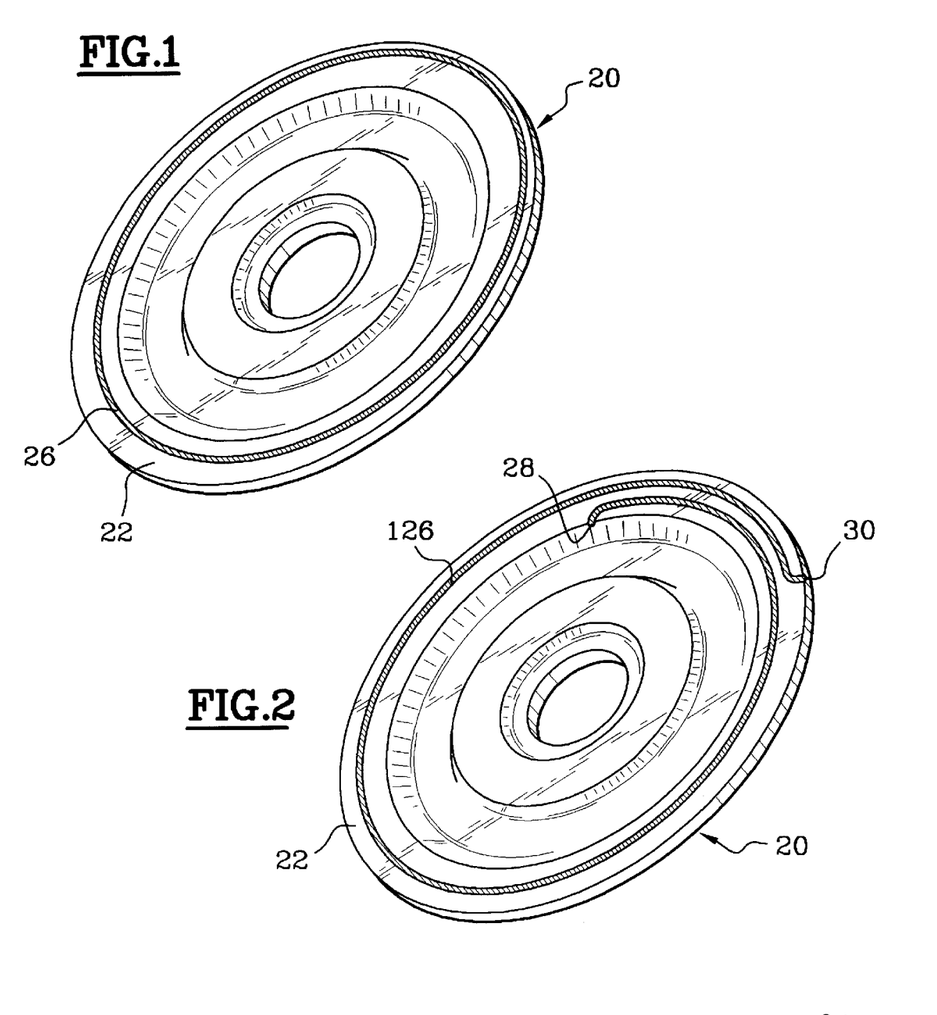
FIG. 1 is a schematic perspective view of a first example of a metallic support in the form of a disc constituting for example a lock-up piston having a first example of a drainage groove in accordance with the teachings of the invention and which is depicted before the operation of moulding the friction lining under pressure.
FIG. 2 is a view similar to that of FIG. 1 on which a second example embodiment of a drainage groove is depicted.

FIG. 1 depicts a part, here the piston of a latching or locking clutch known as a lock-up clutch, of a hydrokinetic coupling appliance, forming a metallic support 20 in the overall shape of a disc, which is delimited by at least one flat annular lateral face 22 designed to receive a friction lining 24 (see FIG. 3) consisting of a mat of fibres impregnated with a thermosetting resin.

The lining is made from a non-woven material containing fibres.

For more information, reference should be made to the document WO-A-95/26473 or to its corresponding U.S. Pat. No. 5,807,518.

Thus the fibres are long fibres with a length of between, for example, 15 mm and 120 mm.

The fibres are chosen from amongst the group consisting of glass, cotton, ceramic and polyacrylonitrile fibres, notably preoxidised.

Powdery fillers are incorporated in the mat. These comprise all or some of the following elements or compounds: copper, rock wool, carbon (coke and/or carbon fibres with reduced powder content, graphite), zirconium silicate, iron sulphide, alumina or latex.

The thermosetting resin contains a polar solvent, preferably aqueous. This resin is for example based on a resol. It has, for example, latex added.

The fibres are mixed and then carded in order to form a carded sheet on which fillers are sprinkled. Next the sheet is napped and then optionally a needling operation is carried out in order to obtain a needled non-woven mat.

Next an impregnation operation is carried out in a bath containing one or more resins of the thermosetting type in solution or dispersed in the bath.

A final curing step is then carried out, associated with a moulding or overmoulding operation during which pressurisation is carried out. The curing ensures the adhesion of the friction lining 24 to the support 20.

During this step use is made of a piston whose movement is limited in order to obtain the required porosity.

The lining is pressed by the piston in contact with the support and therefore adopts the shape of the latter well. Good attachment of the lining to its support is obtained.

The lining thus has a high and stable coefficient of friction, a high resistance to heating at high working pressures, and good resistance to wear.

In accordance with the teachings of the invention, the lateral face 22 which here constitutes the interface face with the lining 22 within the meaning of the invention has at least one groove 26.

In the embodiment in FIG. 1, the groove 26 is closed in a loop and consists here of a circular groove which is closed and off-centre with respect to the axis of the disc 20, and therefore with respect to the annular surface 22.

As a variant, the groove 26 is oblong in shape, for example in the form of an ellipse. Several grooves 26 can be provided. For example, in FIG. 1, another concentric groove can be provided inside the groove 26.

In the variant embodiment illustrated in FIG. 2, the groove 126 is not closed in a loop but on the contrary opens out radially inwards and outwards through its ends 28 and 30.

Naturally several grooves 26 of shorter length can be provided, each groove opening out through its ends radially outwards and inwards.

In all cases the support 20 is made from material impermeable to the liquid, here oil, contained in the hydrokinetic coupling appliance. It is therefore economical whilst being here metallic. The support 20 equipped with its lining constitutes here a clutch disc.

Figure 3:
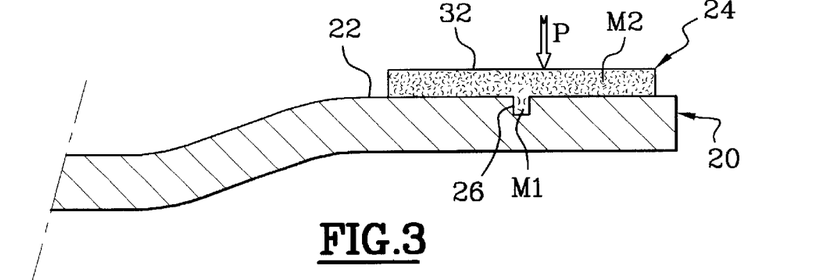
FIG. 3 is a schematic view to a larger scale and in transverse section through a radial plane of the metallic support of FIG. 1 which is depicted after the moulding of the friction lining.
Figures 4, 5:
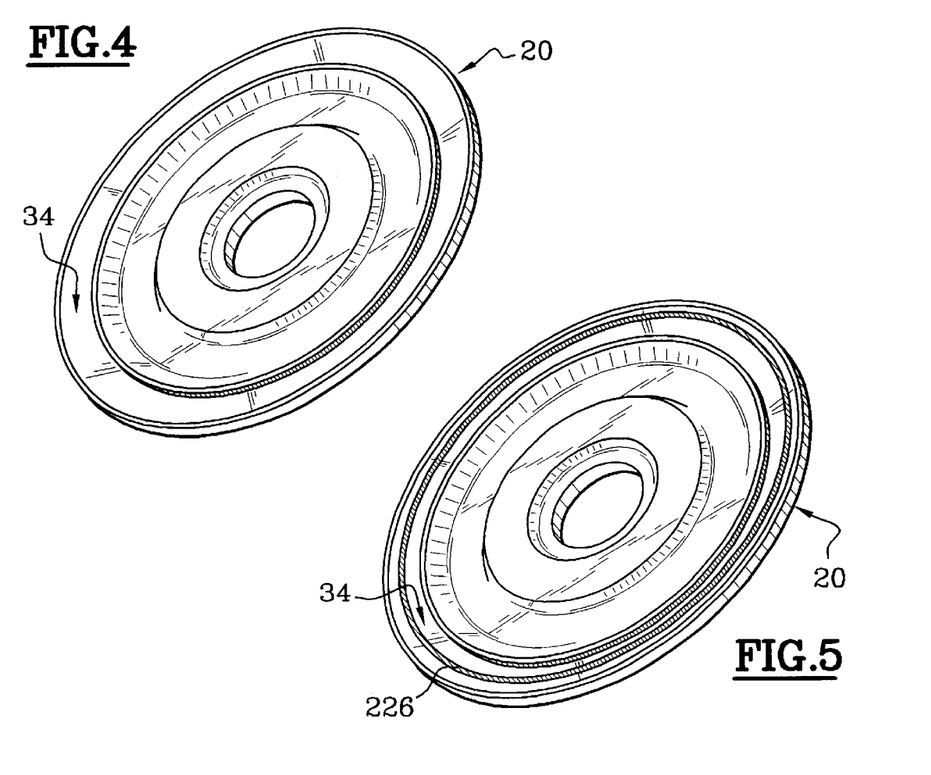
FIG. 4 is a view similar to FIG. 1 which illustrates another example embodiment of the metallic support of a lock-up disc after a first step during which a wide groove with a frustoconical bottom was produced.
FIG. 5 is a view similar to FIG. 3 after the production of a narrow drainage groove in the bottom of the frustoconical groove.
Figure 6:
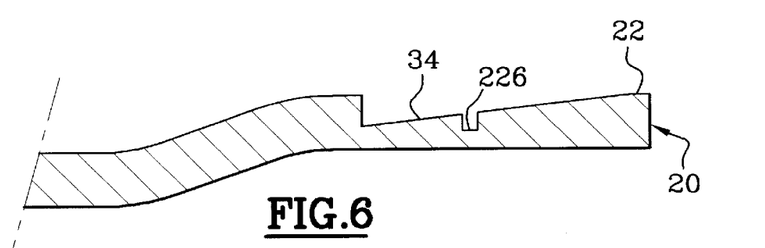
FIG. 6 is a schematic view, in transverse section through a radial plane and to a larger scale, of the disc of FIG. 4 before the moulding of the friction lining.

According to a known general design, the friction lining 24 is in the form of a flat ring, for example continuous, with a constant mean thickness, which delimits an active flat annular lateral friction face 32 designed to cooperate with a corresponding face of a reaction member (not shown).

As mentioned above, the friction lining 24 is placed and fixed to the interface surface 22 during an operation of moulding and curing under pressure during which an element of the mould (not shown) exerts a pressure force P in a direction roughly perpendicular to the plane of the surface 22.

Because of the presence of the groove 26, part of the friction material, which constitutes the lining 24, enters the groove or grooves 26 of the support 20 more rigid than the lining.

Because of the application of a moulding force P, the entry of the friction material in the groove 26 results, in accordance with the teachings of the invention, in a lower density of material M1 received in the groove 26 and just above the latter, compared with the constant mean density of the remainder M2 of the material of the lining 24.

The lower density M1 of the material therefore results in a greater porosity of this material compared with the mean porosity of the material M2.

By virtue of the presence of the groove 26, the porosity of the material is controlled during moulding, thus making it possible to have, in line with the groove 26, a porosity increased by 10 to 50% compared with the mean porosity of the material M2. The groove 26 is thus a drainage groove.

More precisely, in this way a channel internal to the friction lining 24 is obtained which permits preferential passage of the oil under the friction lining 24, thus creating an oil drainage network for increasing the flows of lubricant.

Naturally this drainage is increased when several grooves are provided.

The heat exchanges at the active surface 32 of the friction lining are thus increased significantly, as is the endurance strength under permanent slip or under high loads.

In addition a more even distribution of the pressure of the oil is obtained within and on the surface of the friction material, making it possible to control the oil film which forms on the surface 32 of the material M2 of the friction lining 24 in order to keep the tribological performance of the device substantially constant.

The design according to the invention thus makes it possible to prolong the conditions of maintaining and renewing the oil film on the surface 32 of the friction lining 24 under the effect of the reversible compression of the material which makes it up, which, when it is acted on, behaves like a sponge, releasing the oil which it contains towards the surface 32.

The arrangement according to the invention thus facilitates the discharge of excess oil on the surface 32.

This arrangement does not modify the useful thickness of the friction lining 24 nor the mean porosity thereof, with a friction disc with drainage grooves.

By virtue of the invention the connection of the friction lining 24 with its metallic support is increased.

The groove or grooves formed in the interface surface 22 has for example an axial depth of between 10 and 50% of the mean thickness of the friction lining, according to the flow of oil which it is wished to cause to circulate in the channel thus formed.

The shape and dimensions, as well as the orientation, of the groove or network of grooves formed in the interface surface 22 are such that it is possible to obtain channels for supplying the interior of the material with oil, and are such that they have sections perpendicular to the direction of shearing of the material during use of the device.

The grooves can have any simple or combined shapes making it possible to obtain an effective drainage network.

In addition to the two schematic representations given in FIGS. 1 and 2, the grooves can thus be, for example, radial, in a spiral, in an S shape, circumferential, rectilinear, etc.

In a known manner, the active friction surface 32 of the friction lining 24 can also have a network of grooves (not shown).

In addition to the improvement and control of the circulation of oil, the invention also aims to improve the distribution of stresses and deformations in the friction material For this purpose, as depicted in FIGS. 4 to 7, there is produced, for example, in the annular lateral face 22 of the disc 20, a first wide groove 34, which is here a centred annular groove with a frustoconical profile with its greatest axial depth situated here radially towards the inside.

In the surface with the frustoconical bottom of the groove 34, it is also possible to produce a narrow drainage groove 22 of the type mentioned above with reference to FIGS. 1 to 3.

Figure 7:
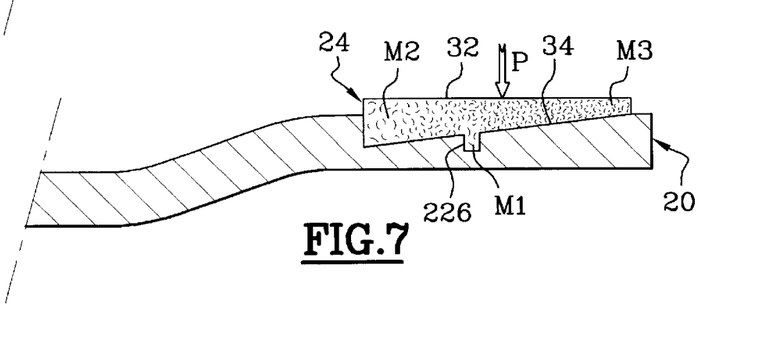
FIG. 7 is a view similar to FIG. 6 which depicts the disc after overmoulding of the friction lining.

After overmoulding of the friction lining 24, as can be seen in FIG. 7, the latter has a density, and therefore a porosity, which is controlled in its different areas.

After the moulding and curing operation, the friction lining 24 still has an active friction face 32 perpendicular to the axis of the disc 20, which is therefore parallel to the bottom of the groove 34 constituting here the interface surface to which the friction material is attached.

Because of the operation of moulding under pressure, the density of the friction material M3 in the radially external annular part of the lining 24 is greater than the density of the material M2 in the radially internal annular part of the lining, whilst the density of the material M1 received in the drainage groove 226 is itself less than the density of the material M2.

The presence of the narrow drainage groove 226 in the bottom of the frustoconical groove 34 procures the advantages mentioned above.

The modulation of the thickness of the friction lining 24, in a radial direction obtained by the frustoconical conformation of the groove 34 and by the shape of the mould resulting in the formation of the active friction surface 32, makes it possible to obtain a control over the density, and therefore the porosity of the friction material.

Figure 14:
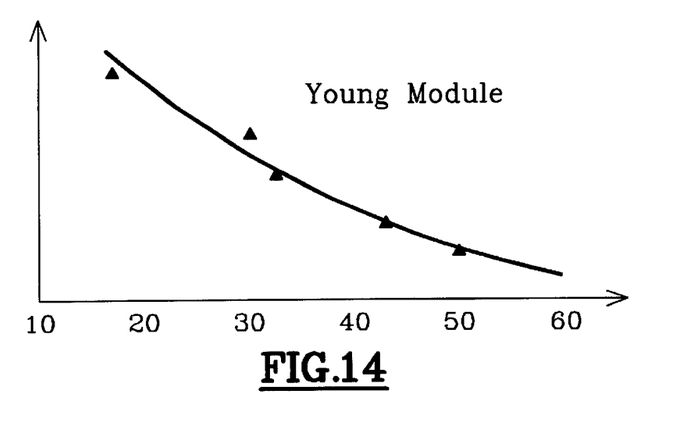
FIG. 14 depicts the variations in the Young's modulus of the friction material as a function of the stresses encountered during the use of the device.

Because of this, it is therefore possible to modulate the mechanical properties, such as the Young's modulus depicted in FIG. 14, and Poisson's ratio, according to the stresses encountered during the use of the device.

The coating of friction material thus produced has mechanical characteristics such that the stress field produced during the application of a force is more even.

This improves the endurance of the friction lining operating in oil.

In addition, the presence of grooves results in the formation of areas of recessing of the friction material in the metallic support 20 which increases its surface area of contact with the support by 10 to 30%, and, in a similar proportion, its resistance to pulling off and shearing.

The principles of the invention can also be applied to a synchronisation ring as illustrated in FIGS. 8 to 13.

Figure 8:
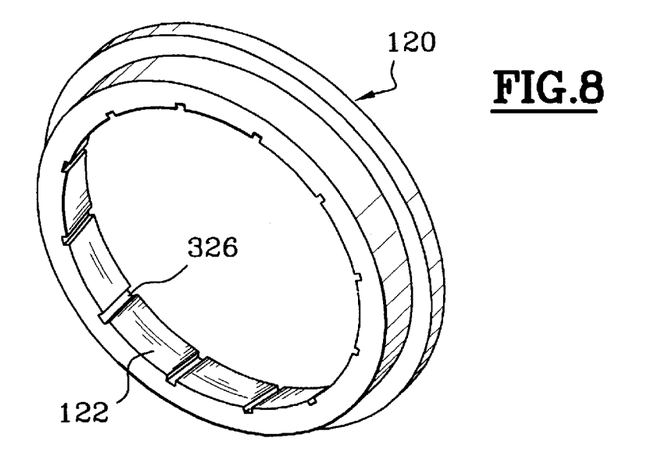
FIGS. 8 to 10 are three similar views which depict three example embodiments of drainage grooves in the internal frustoconical lateral surface of the annular metallic support constituting the body of a synchronisation ring, depicted schematically.
Figure 9:
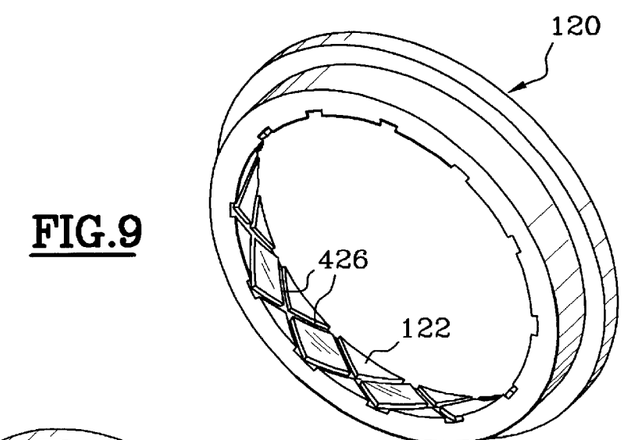
Figure 10:
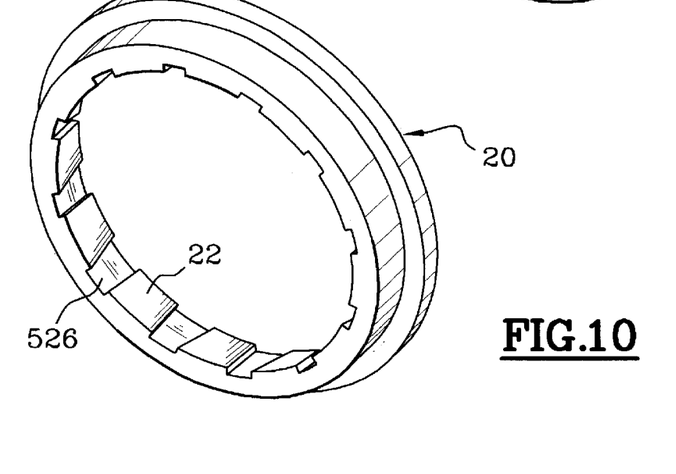

As can be seen in FIGS. 8 to 10, a synchronisation ring 120 consists overall of a support in the form of a frustoconical metallic ring delimited by a frustoconical internal lateral surface 122 which is for example designed to receive a flat annular lining 124 made of friction material.

In accordance with the teachings of the invention, and as can be seen in FIGS. 7 to 9, there is formed in the annular frustoconical interface surface 122 a network of drainage grooves, which affords better connection between the ring 120 and the lining 124.

In FIG. 8, the grooves 326 are rectilinear grooves with an axial orientation with parallel edges.

In FIG. 9, the grooves 426 are non-axial crossed grooves, whilst in FIG. 10 the grooves 526 are axial in orientation, with a greater width and non-parallel edges.

Figure 11:
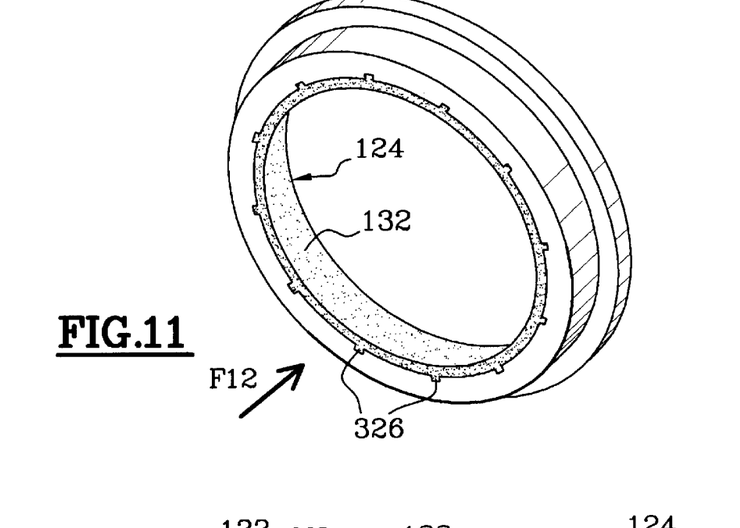
FIG. 11 is a view similar to FIG. 7 which depicts the synchronisation ring after the overmoulding of the friction lining.
Figure 12:
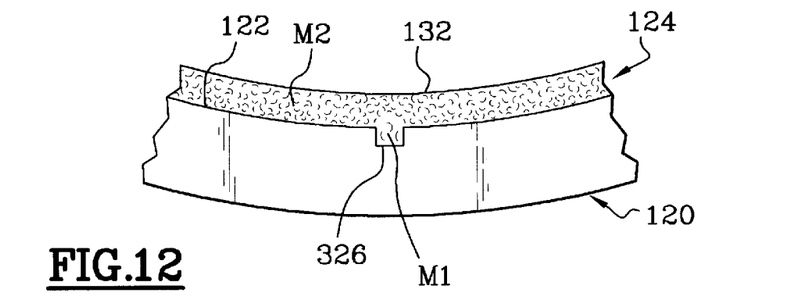
FIG. 12 is a detail view to a larger scale in the direction of the arrow F12 in FIG. 11.

As can be seen in FIGS. 10 and 11, the friction lining 124, after its pressure moulding operation, enters the drainage grooves 26 resulting in the formation of areas of material M1 and M2 of different densities, and therefore different porosities.

The active friction surface 132 of the friction lining has a frustoconical smooth shape overall, but can also naturally have a network of grooves (not shown) in a known manner.

Figure 13:
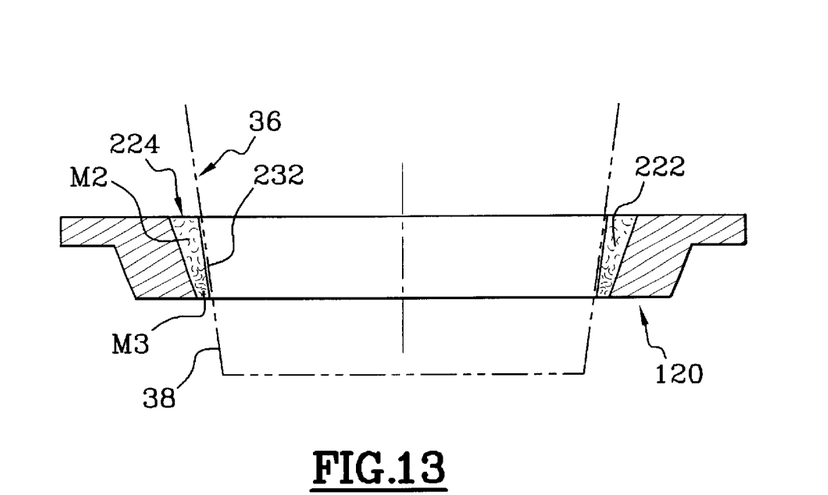
FIG. 13 is a schematic view in transverse section through a radial plane which illustrates another design of a synchronisation ring in accordance with the teachings of the invention.

FIG. 13 depicts a design according to which, after pressure moulding, the frustoconical active friction surface 232 is not parallel to the internal lateral interface surface 222.

This design is for example obtained by means of a mould element 36 illustrated schematically in silhouette, whose external frustoconical lateral surface 38 allows the formation by pressure moulding of a lining 224 with non-parallel lateral faces.

As mentioned previously with reference to FIGS. 3 to 6, it is thus possible to produce a lining having two areas of increasing density M2 and M3.

According to a variant which is not shown, it is of course possible to combine the effects of different degrees of compactness of the friction material with the presence of drainage grooves in the interface surface 222.

The supports 20, 120 which receive the friction material are generally metallic and can be obtained by any process such as stamping, sintering, forging, cropping, pressing, casting or by machining by removal of swarf or by planishing.

The friction materials applied thereto by a pressure moulding operation are porous friction materials with mouldable open cells and are for example in the form of bands of constant thickness before the moulding operation.

In general terms the support 20, 120 is impermeable to oil. It is advantageously more rigid than the friction lining.

Naturally the support for the friction lining 24 is not necessarily mounted on the piston of the lock-up device.

Figure 15:
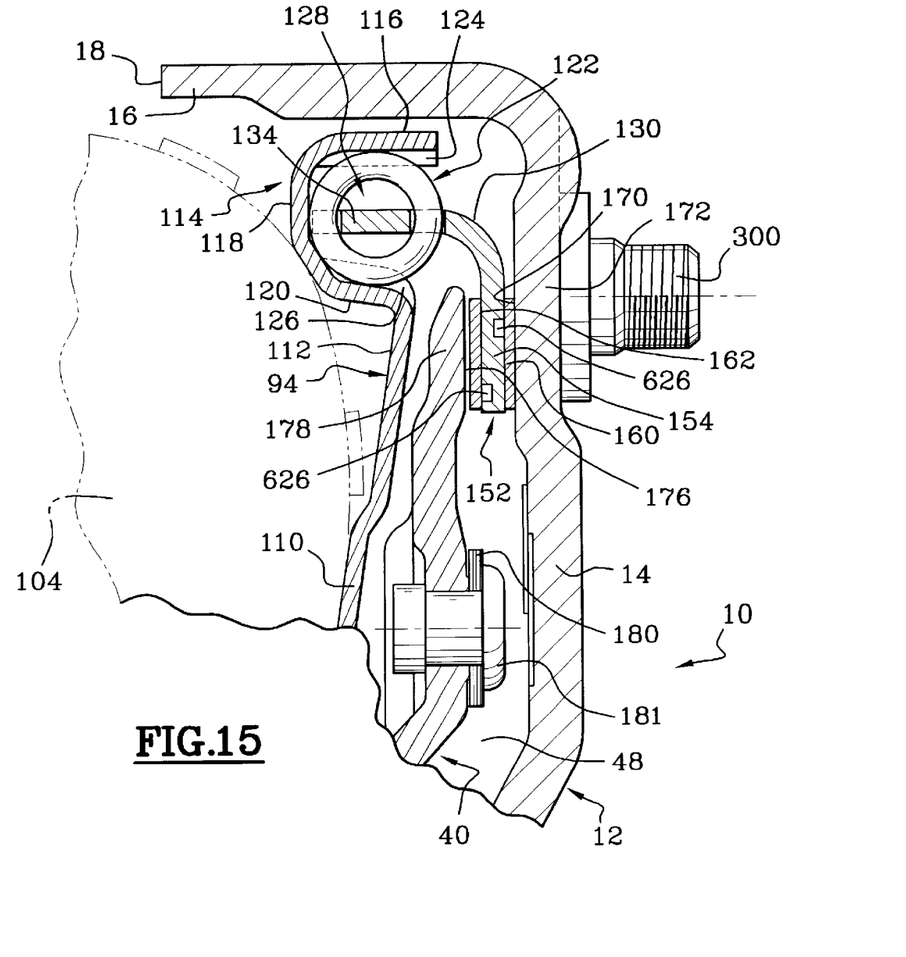
FIG. 15 is a partial view in axial section of a hydrokinetic coupling appliance equipped with a friction disc according to the invention.

Thus in FIG. 15 the metallic support can consist of a disc 152 having a flat ring 154 whose annular opposite flat faces each bear a rear friction lining 160 and front friction lining 162 so as to constitute an apparatus of the "dual-face" type.

The lining 160 is designed to cooperate with an annular friction track 170 formed opposite the radial wall 14 of the hydrokinetic coupling device 10. The wall 14 carries, in a known manner, fixing pieces 300 for a flange for connecting the appliance 10 to a driving shaft, namely the crankshaft of the vehicle engine in the case of an application to a motor vehicle.

The track 170 is machined in a transversely oriented portion 172 of the wall 14.

The front friction lining 162 is designed to cooperate with an annular friction track 176 formed on the corresponding face of the external periphery 178 of the piston 40. The piston 40 is connected with respect to rotation, with axial mobility, to the wall 14 by means of axially elastic tongues 180 fixed by rivets 181 to the piston 40 and by other rivets (not visible) to the wall 14 belonging to the casing 12 of the appliance 10 having a turbine wheel 104 and a control chamber 48 delimited by the piston 40 and wall 14. The casing 12 is filled with oil, in which the linings 160, 162 are immersed.

In a known manner and as can be seen in the document U.S. Pat. No. 5,566,802, the wall 14 is extended at its external periphery by a skirt 16 whose free end 18 is intended to be fixed to a shell secured to the impeller wheel (not visible) of the appliance 10. The disc 152 has drive lugs 128 connected by an elbow 130 to the body 154. Each lug 128 has two studs 134 for centring and holding a spring 122 forming a structural whole with the friction disc 152. The springs 122 are mounted in a portion 144 secured to a flange 94 connected to a hub (not visible) secured with respect to rotation to a driven shaft. The hub is secured to the turbine wheel 104. The portion 144 is delimited by sections 116, 118, 120 delimiting a groove open axially in the direction of the wall 14. The springs 122 enter the groove.

The sections 116 and 120 have locally dished parts respectively 124 and 126 for abutment of the circumferential ends of the springs 122, here of the coil type.

The flange 94 is interposed between the turbine wheel 104 and the piston 40, whilst the friction disc 152, equipped with the linings 160, 162 is interposed between the piston 40 and the wall 14.

The disc 152 belongs to a locking clutch, also referred to as a latching or lock-up clutch.

In FIG. 15, the clutch is disengaged, so that the casing 12 is connected with respect to rotation to the hub of the appliance by means of the turbine wheel 104 driven in rotation by the circulation of oil caused by the impeller wheel (not visible).

By causing the hydraulic pressure to vary in the chamber 46, the piston 40 clamps the friction linings 160, 162 so that the torque is transmitted directly from the casing 12 to the hub via the disc 152, springs 122 and flange 94.

For more information, reference should be made to the document FR 98 02 808 filed on Mar. 3, 1998 and published under the number 2 775 747.

The disc 152 equipped with the linings 160, 162 is therefore a clutch disc.

As will have been understood, the drainage grooves 26 are produced on each of the faces of the metallic flat ring 154 of the friction disc 152.

The material of the friction linings 162, 160 moulded under pressure therefore extends into the grooves 626 in order to constitute areas of controlled porosity greater than the mean porosity of the body of the said linings 160, 162.

It will be appreciated that there is no need to provide several grooves per face, since the ring 154 is provided with a groove on each of its faces. The grooves can have those of FIGS. 1 and 2.

Naturally, as a variant, the linings 160, 162 can be fixed respectively to the portion 172 of the wall 14, roughly of transverse orientation, and to the external periphery 178 of the piston 40.

The grooves can therefore be produced also in the wall 14. In all cases the ring 154 is intended to be clamped between the piston 40 and the wall 14.

It will be appreciated that the formation of the grooves 26 in the ring 154 is favourable since the latter is less thick.

The grooves 626 are therefore more easy to produce by pressing.

In FIGS. 1 to 7 the piston 20 forms part of a single-face lock-up clutch so that the friction lining is designed to come into contact with the portion 172 of the wall, the assembly consisting of piston 20 and lining 24 then forming the clutch disc.

The "dual-face" clutch in FIG. 15 can be transformed into a single-face clutch. Thus it is possible to fix the ring 154 by riveting to the piston 40, or more precisely to the face thereof turned towards the flange 94, and to fix the lining 162 on the piston 40 as in FIGS. 1 to 7, the lining 160 then being omitted.

In this type of design the piston is no longer connected with respect to rotation to the turbine wheel.

As a variant the portion 114 is fixed directly, for example by welding or clamping, to the external wall of the turbine wheel 104.

In this case the flange 94 is omitted.

It is possible to connect the lugs 124 with respect to rotation directly to an annulus, secured to one of the elements consisting of turbine wheel 104 and hub.

For example the annulus is welded to the turbine wheel, the lugs 128 entering mortices in the annulus for connection with respect to rotation by cooperation of shapes.

The turbine wheel 104 being secured to the hub, in all cases the friction disc 152, 160, 162 or the assembly consisting of piston 20 and lining 24 is able to be connected with respect to rotation disconnectably to the wall 14 of the casing 12.

Naturally several friction discs can be provided as described in the document U.S. Pat. No. 5,566,802 showing the hub of the appliance For the record, it should be stated that a synchronisation ring is intended, in motor vehicle gearboxes, to synchronise the gearbox ratio changing. The gearbox is filled with oil and synchronisation rings are mounted therein.

More precisely, two synchronisation rings are mounted on each side of a synchronisation body fluted internally for its connection to a shaft, the assembly consisting of synchronisation body and ring being interposed between two pinions in the gearbox.

A sliding sleeve is mounted on the synchronisation body and meshes with the latter whilst being subject to the action of a fork for moving the sliding sleeve axially in one direction or the other in order to come into engagement with the teeth (not visible in FIGS. 8 to 13) which the ring 120 has at its external periphery at the level of its radial rim.

The ring 120, through its internal cone, thus comes into engagement with an external cone on a clutch piece associated with the pinion concerned. For more information reference should be made for example to the documents EP-A-0 717 212 and DE-A-37 35 978.

What is claimed is:

1. Device using friction in a liquid medium having a support impermeable to the liquid, on which an interface surface forms a support for a friction lining, produced from a friction material which has a porous structure with communicating cells and which has areas (M1, M2, M3) with different controlled porosities, in which the method of manufacturing the friction lining includes a step of moulding under pressure, characterised in that the interface surface of the support has at least one groove in which there extends the friction material moulded under pressure in order to constitute an area of controlled porosity (M1, M2) greater than the mean porosity (M2, M3) of the body made from friction material constituting the lining.

2. Device according to claim 1, characterised in that the groove is closed in a loop in order to form a fluid circulation channel within the friction lining.

3. Device according to claim 2, characterised in that the groove consists of a closed circular groove off-centre with respect to the interface surface in order to form a fluid circulation channel inside the friction lining.

4. Device according to claim 1, characterised in that the groove opens out radially inwards and outwards through its ends.

5. Device according to claim 1, characterised in that several grooves are provided.

6. Device according to claim 1, characterised in that the mean depth of the groove is between 10% and 50% of the mean thickness of the lining.

7. Device according to claim 6, characterised in that the groove is such that it has a section, transverse to its general direction, which is perpendicular to the direction of shearing of the friction material during use of the device.

8. Device according to claim 1, characterised in that at least part of the interface surface is not parallel to the active friction surface of the lining.

9. Device according to claim 8, characterised in that the support is overall in the form of a flat ring and in that the interface surface has a frustoconical profile and in that the active friction surface is not parallel to the frustoconical interface surface so as to constitute an annular area with a controlled porosity (M3) less than the mean porosity (M2) of the body made of friction material constituting the lining.

10. Device according to claim 9, characterised in that the interface surface is formed by the bottom of a wide annular groove formed in a lateral face of the flat annular support.

11. Device according to claim 9, characterised in that the frustoconical interface surface has at least one narrow groove in which the friction material (M1) moulded under pressure extends.

12. Device according to claim 1, characterised in that the friction material consists of a mat of fibres impregnated with a thermosetting resin.

13. Device according to claim 1, characterised in that the size of the communicating cells is between 50 and 500 micrometers.

14. Device according to claim 1, characterised in that the porosity of the friction material is less than 60%.

15. Device according to claim 1, characterised in that the active friction surface of the lining has a network of grooves facilitating circulation of oil between the friction lining and a reaction surface with which the device cooperates.

16. Device according to claim 1, characterised in that the groove is produced in the piston of a hydrokinetic coupling appliance.

17. Device according to claim 1, characterised in that at least one groove is produced on each of the faces of a friction disc belonging to a hydrokinetic coupling appliance of the "dual-face" type.

18. Device according to claim 1, characterised in that the groove is formed in the frustoconical internal surface of a synchronisation ring of a gearbox.

19. Device according to claim 1, wherein the support impermeable to the liquid is metallic.

* * * * *